United States Patent [19]
Sun et al.

[11] Patent Number: 6,079,204
[45] Date of Patent: Jun. 27, 2000

[54] TORQUE CONTROL FOR DIRECT INJECTED ENGINES USING A SUPPLEMENTAL TORQUE APPARATUS

[75] Inventors: Jing Sun, Bloomfield; Jeffrey Arthur Cook, Dearborn; Ilya V. Kolmanovsky, Ypsilanti, all of Mich.

[73] Assignee: Ford Global Technologies, Inc., Dearborn, Mich.

[21] Appl. No.: 09/157,435

[22] Filed: Sep. 21, 1998

[51] Int. Cl.$^7$ ...................................................... F01N 3/00
[52] U.S. Cl. .................... 60/274; 60/285; 60/286; 180/165; 180/65.2
[58] Field of Search .............................. 60/274, 285, 278, 60/280, 286, 284; 701/84; 180/165, 65.2, 65.3, 65.8, 65.4

[56] References Cited

U.S. PATENT DOCUMENTS

| 5,323,868 | 6/1994 | Kawashima | 180/65.4 |
| 5,588,498 | 12/1996 | Kitada | 180/65.4 |
| 5,609,218 | 3/1997 | Yamashita et al. | 180/197 |
| 5,836,151 | 11/1998 | Atanasyan et al. | 60/274 |
| 5,894,724 | 4/1999 | Minowa et al. | 60/274 |
| 5,978,719 | 11/1999 | Yano et al. | 701/22 |

FOREIGN PATENT DOCUMENTS

| EP 0 899 151 A2 | 2/2000 | European Pat. Off. |
| EP 0 926 327 A2 | 2/2000 | European Pat. Off. |
| EP 0 931 923 A1 | 2/2000 | European Pat. Off. |
| EP 0 943 790 A2 | 2/2000 | European Pat. Off. |

Primary Examiner—Thomas Denion
Assistant Examiner—Binh Tran
Attorney, Agent, or Firm—Allan J. Lippa; Roger L. May

[57] ABSTRACT

A torque control system for a lean burn engine utilizing a supplemental torque apparatus that is operable during the engine mode transition from a lean air/fuel ratio to a rich air/fuel ratio. The supplemental torque apparatus 34, STA, operates to maintain the basic engine torque equation $T_e + T_{sta} = T_d$, such that the device or a electrically connected battery 38 absorbs extra engine torque during a predetermined time period and generates engine torque at times other than the predetermined time period. During the predetermined time period, a lean NOx Trap 26 in the exhaust system is purged.

12 Claims, 4 Drawing Sheets

TORQUE CONTROL FOR DIRECT INJECTED ENGINES USING A SUPPLEMENTAL TORQUE APPARATUS

FIELD OF THE INVENTION

This invention relates to lean burn engines in general and more particularly to controlling the torque in a stratified charge direct injected spark ignited engine having a lean NOx trap, LNT, in the exhaust system.

PRIOR ART

The ability of lean burn engines to meet emission regulations, in particular with respect to the oxides of nitrogen, NOx, is limited unless advanced exhaust aftertreatment devices are used. For NOx reduction the current state of the art technology points towards the use of a lean NOx Trap, LNT, as a most practical solution.

However, the LNT has to be periodically purged to maintain its level of conversion efficiency. As an example, for direct injected spark ignited, DISI, engines running in the stratified mode, the LNT is typically purged by running the engine slightly rich of stoicheometry for a few seconds in approximately every fifty seconds.

One of the disadvantages encountered in doing the purge during operation of a running vehicle is that if the purge cycle is not properly controlled, an undesirable engine torque disturbance is created. This undesirable engine torque disturbance will be noticed by the vehicle driver resulting in unacceptable drivability conditions of the vehicle.

In some prior art solutions, an electronic throttle control system is used to control the generation of this undesirable engine torque disturbance. The electronic throttle control operates to adjust the airflow rate into the engine depending upon the desired levels of torque.

SUMMARY OF THE INVENTION

It is therefore an advantage of the present invention to control the purging of the LNT to avoid any undesirable engine torque disturbances.

It is another advantage of the present invention to utilize a supplemental torque apparatus operatively connected to the engine to either generate needed torque or to absorb excess torque.

These and other advantages will become evident from the following method for torque control for a drive unit including fuel injected engine having a lean NOx Trap, LNT, in the exhaust system and a supplemental torque apparatus operatively connected to the engine. The method first identifies the time for purging the LNT from an algorithm contained in the electronic control unit of the vehicle. The state of charge of the vehicle battery is monitored to determine the level of the battery charge. The algorithm then proceeds to change the operational mode of the engine from lean to a rich air/fuel ratio, wherein such change results in an increased engine torque.

During the rich air/fuel ratio mode, the increased level of carbon monoxide (CO) ratio purges the LNT. The algorithm controls and maintains the desired torque output of the engine during the transition from lean A/F to rich A/F and the rich A/F purge. Excess engine torque is converted by the supplemental torque apparatus into electrical energy that is stored in the battery. After a predetermined time, the algorithm operates to change the operational mode of the engine from the rich air/fuel ratio to the lean air/fuel ratio. During the lean air/fuel ratio mode, the algorithm controls the release of the stored electrical energy.

DETAILED DESCRIPTION OF PREFERRED EMBODIMENT

Supplemental Torque Apparatus, STA, include electrical machines such as motor-generators, or mechanical devices such as flywheels that can store and release energy. More generally, a Supplemental Torque Apparatus can be any device which, when connected to the engine crankshaft, is capable of bi-directional energy transfer such as supplementing or absorbing engine torque, and energy storage. The example, cited in this invention, is a combined alternator-starter, CAS, coupled to the output shaft of the engine and electrically connected to the battery. Other supplemental torque devices may be substituted for the CAS without departing from the spirit of the invention.

Direct injection, DI, refers to spark ignition gasoline engines wherein fuel is injected directly into the cylinder. Port fuel injection refers to conventional spark ignition engines wherein fuel is injected into the intake manifold runners upstream of the intake valve.

Homogeneous lean burn refers to either direct injected or port fuel injected engines that operate at homogeneous air/fuel, A/F, mixtures greater than stoichiometric value. Stratified charge refers to DI engines wherein a combustible mixture is produced at the spark plug at the time of ignition, although the overall A/F ratio in the cylinder is substantially lean of stoichiometry.

For both homogeneous and stratified charge operation, fuel economy benefits are achieved by improvements in volumetric efficiency gained by unthrottled operation. The power output of the engine is controlled by varying the amount of injected fuel. This invention pertains to either port or direct injection homogeneous lean burn engines or direct injected stratified charge engines. For describing the best mode of the invention, a direct injected gasoline engine with multiple operating modes is used. The operating modes are rich/stoichiometric, lean homogeneous, and stratified. Any reference to lean operation includes either lean homogeneous or stratified charge.

Figure 1:
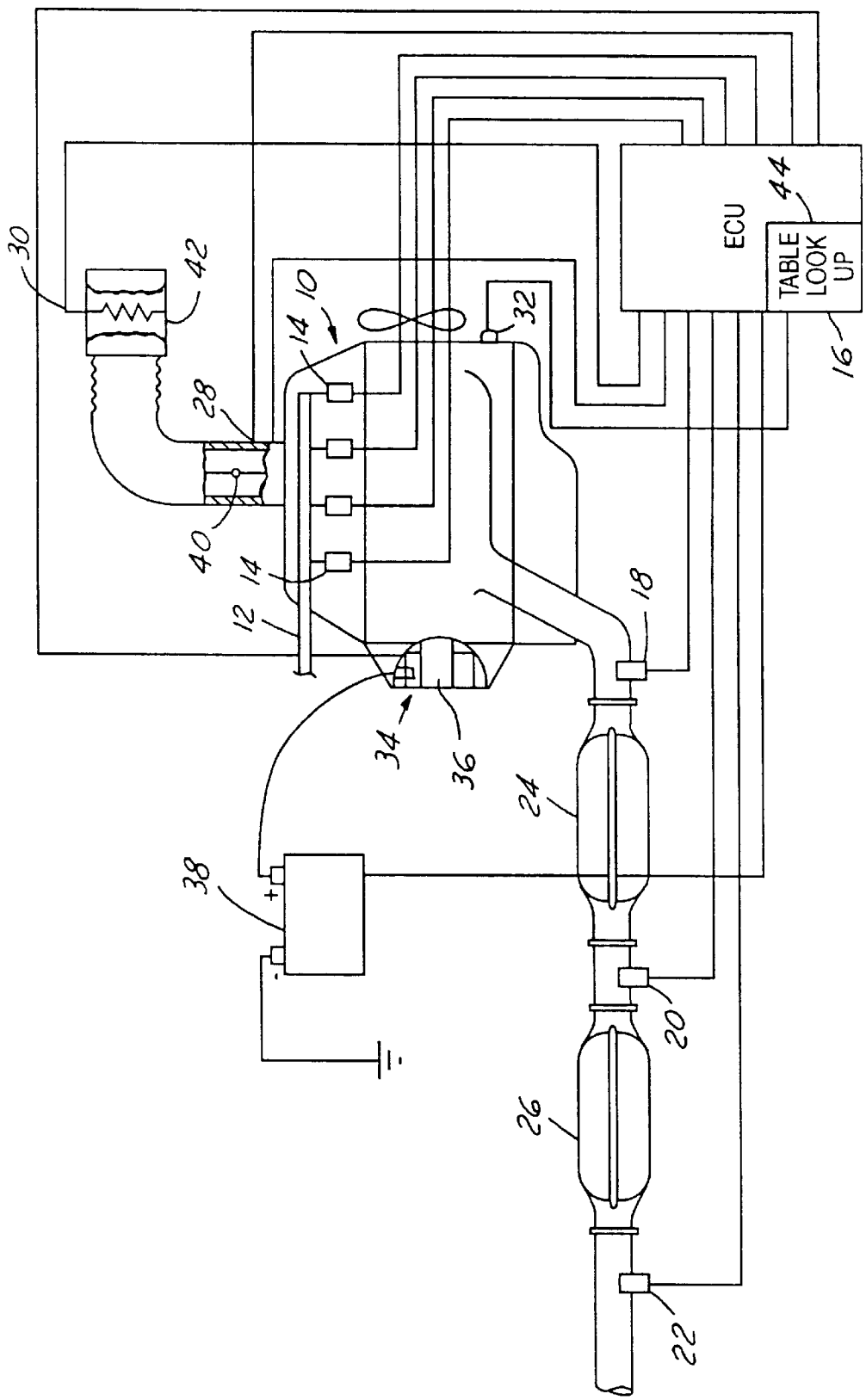
FIG. 1 is a schematic of the powertrain for a lean burn engine in a motor vehicle.
Figure 2:
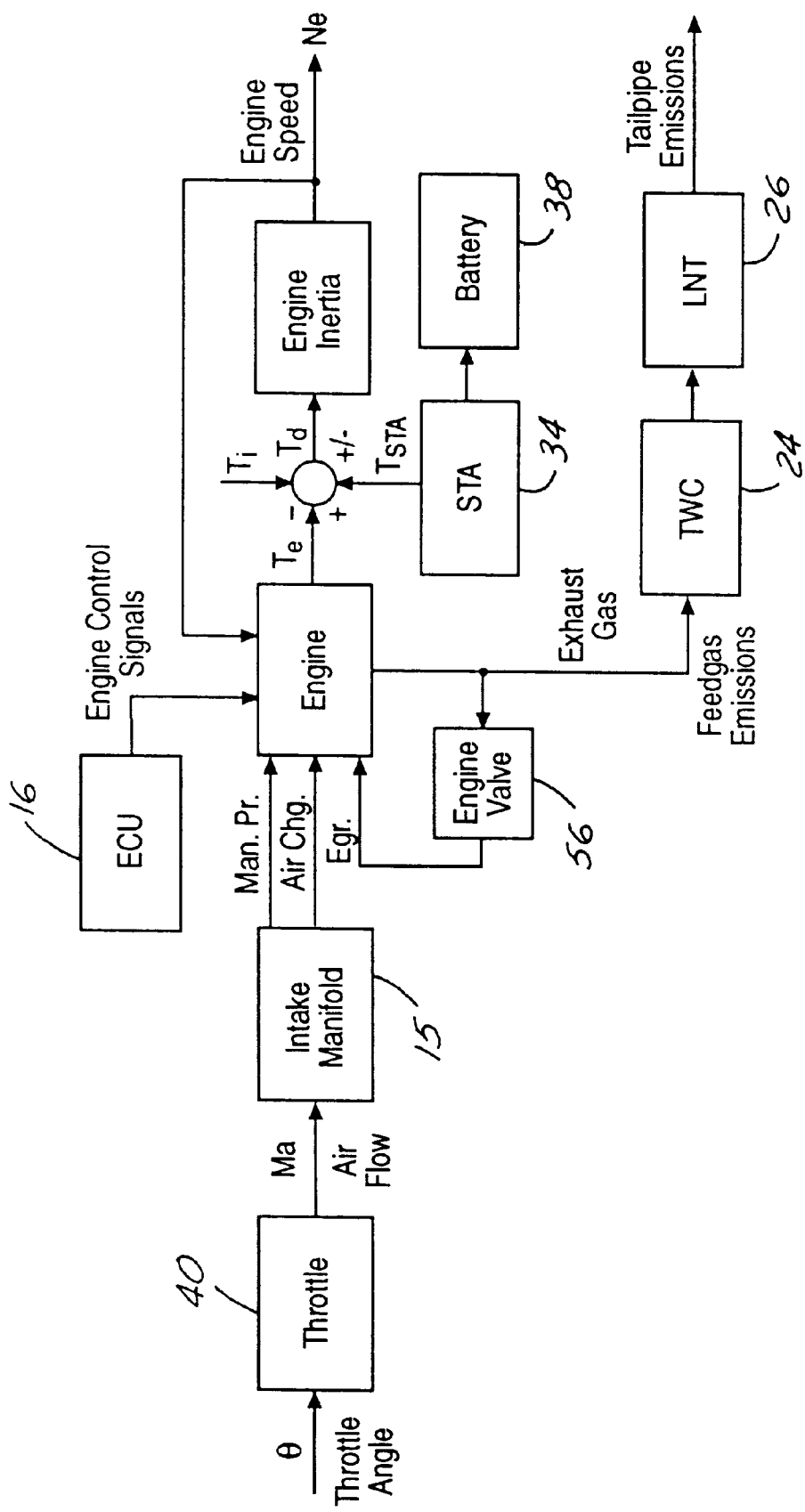
FIG. 2 is a schematic of the torque control system of the present invention.
Figure 3:
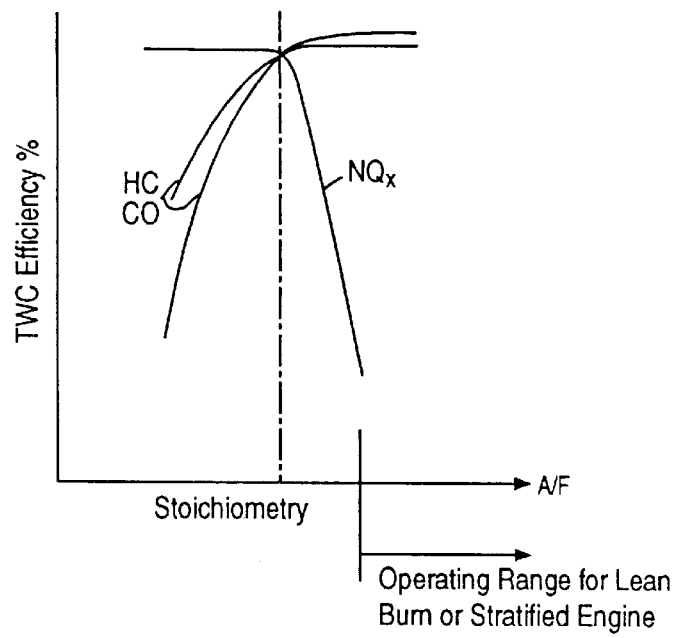
FIG. 3 is a graph of the efficiency of a three-way catalyst of an internal combustion engine according to the air/fuel ratio.

Referring to the Figures by the characters of reference, there is illustrated in FIG. 1 a schematic of the powertrain of a spark ignited direct injection engine 10. The main characteristic of the engine is that it is adaptable to operate as a stratified charge burn engine. The engine has a fuel rail 12 for supplying fuel from a fuel tank, not shown, to a plurality of electronic fuel injectors 14 located in the intake manifold 15. One or more algorithms stored in an electronic control unit 16, ECU, control the fuel injectors 14. The basic control of the fuel injectors is well known and is not the subject of the invention.

The ECU 16 has several conventional input signals and includes signals from at least three exhaust gas sensors 18, 20, 22. The first exhaust gas sensor 18 is positioned upstream from a three-way catalyst 24. The second exhaust gas sensor 20 is position between the three-way catalyst 24 and a lean NOx trap 26, LNT. The third exhaust gas sensor 22 is positioned downstream of the LNT 26. Other inputs include a signal 28 from the throttle position sensor; a signal 30 from an airflow sensor; an engine speed signal 32, etc. The outputs of the ECU 16 are injector commands, spark timing commands, throttle position commands and commands for controlling the supplemental torque apparatus 34, STA, and other conventional outputs.

Figure 4:
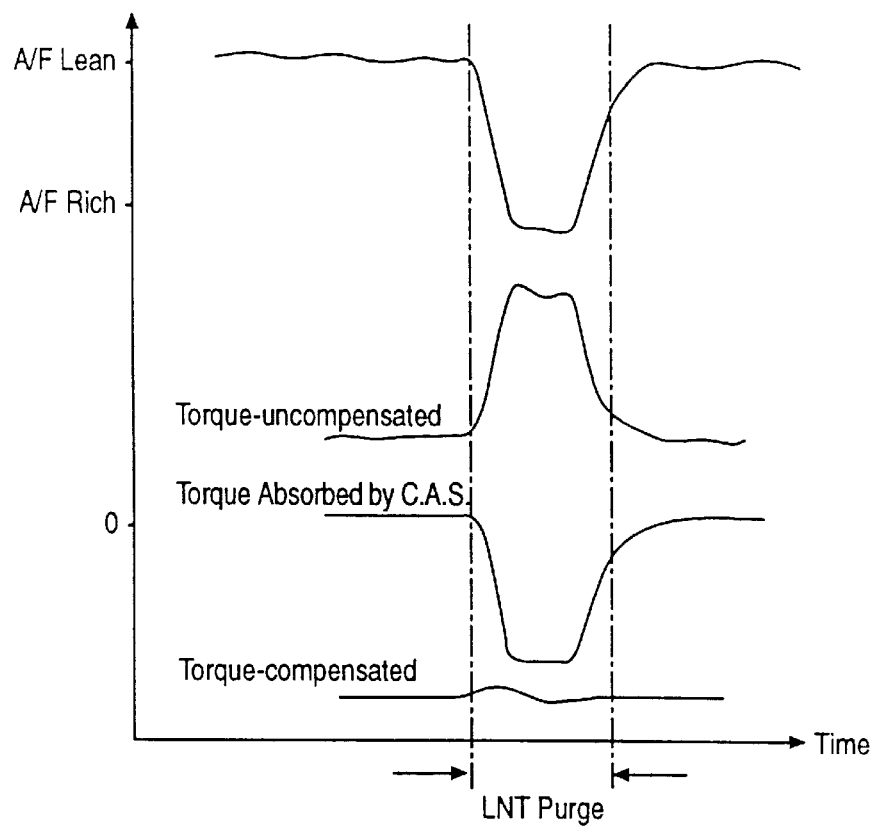
FIG. 4 illustrates four waveshapes represent the torque found at several points of FIG. 2 during LNT purge.
Figure 5:
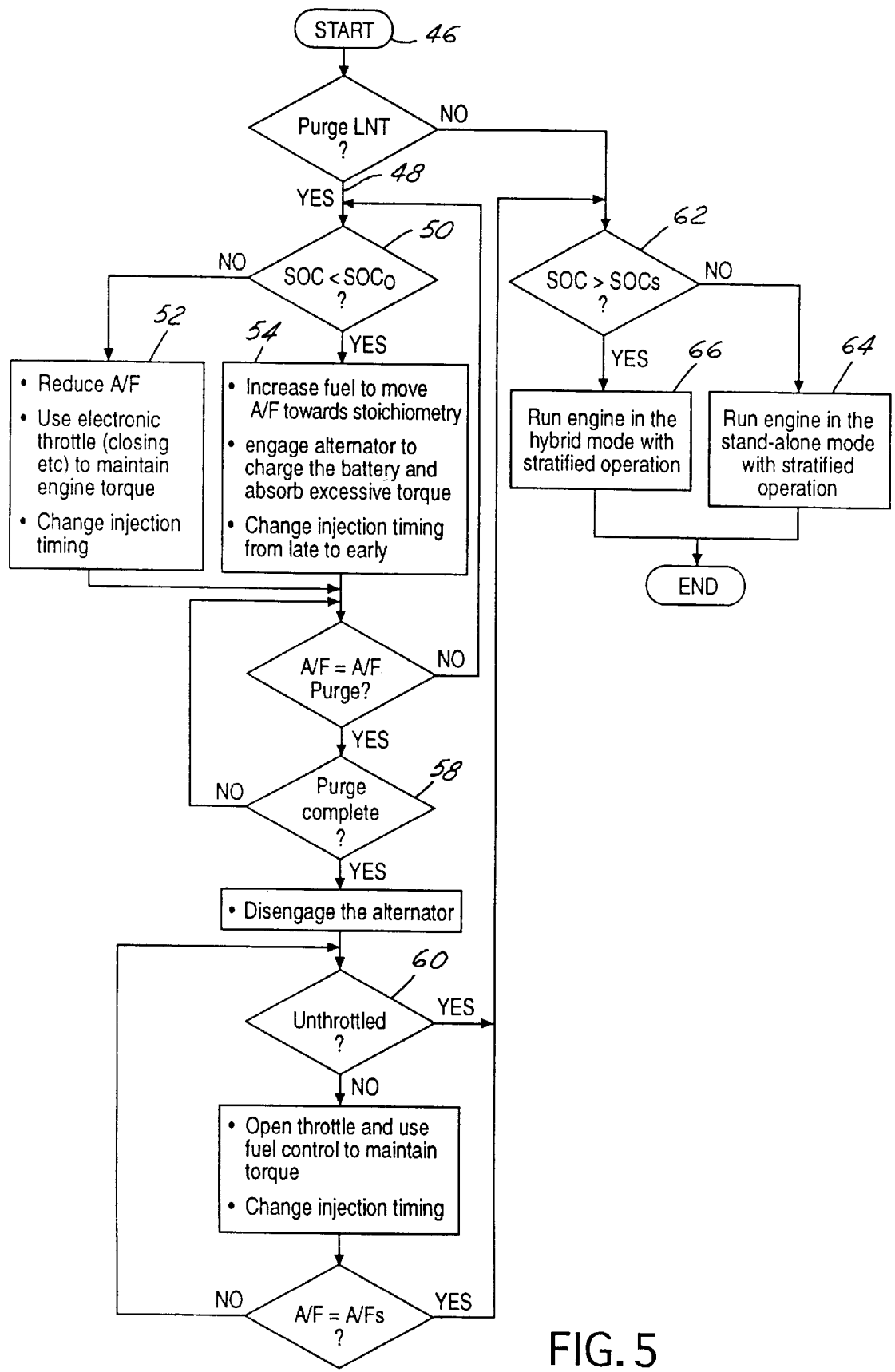
FIG. 5 is a flowchart of the algorithm according to the invention.

In the present invention, the STA 34 is a combined alternator-starter, CAS, unit as identified in FIG. 4. The STA 34 is coupled to the output shaft or crankshaft 36 of the engine and is electrically connected to the battery. In the air intake to the engine is a throttle which may be controlled by an electronic throttle control or the operation of the operator. Upstream from the throttle control is a mass air flow meter for measuring the air being ingested in the engine. Engine load is represented by electrical signals from a manifold pressure sensor in a manner that is well known. Spark timing may be used for additional torque authority.

The driver's pedal position and (engine rpm ($N_e$) determine the driver's demanded torque. A look-up table 44 in the ECU 16 memory can be used to represent this dependence. The torque, $T_L$ demanded by any of the auxiliary subsystems (for example, air-conditioning, power steering, etc.) is added to the driver's demanded torque to determine the total torque demand ($T_d$) to be satisfied by the drive unit, that is, by the combined action of the engine and the STA 34. The procedure for the determination of the engine torque demand is a part of several functioning engine management systems, including, for example, Bosch ME 7 (Motronic) system.

The engine output torque $T_e$ depends on a number of variables including the engine speed, the fueling rate ($W_f$), the spark timing ($\theta$), cylinder intake airflow ($W_a$), the burnt gas fraction ($F_1$) and the operating mode as determined by injection timing ($\mu$; stratified or homogeneous):

$$T_e = T_e(N_e, W_f, \theta, W_a, F_1, \mu). \quad (1)$$

A regression equation for $T_e$ can be stored in ECU. The variables that enter into this equation are either measured or estimated online by the standard algorithms located in the ECU 16.

The maximal torque ($T^{max}_{sta}$) that can be generated or absorbed by the STA 34 is a function of at least the engine speed Ne and the state of the energy storage ($\sigma$):

$$T^{max}_{sta} = T^{max}_{sta}(N_e, \sigma)$$

This function is stored either as a look-up table or as a regression in the ECU. For an STA 34 that includes a battery 38 and an electric combined alternator/starter, the state of the energy storage is the state of charge of the battery 38. The actual torque generated or absorbed by the STA $T_{sta}$ is limited by $T^{max}_{sta}$. The time-update equation $\sigma$ a has the general form:

$$\sigma(t=\Delta t)=\sigma(t)-\epsilon N_e(t)\pi/30)T_{sta}(t)\Delta t$$

where $0<\epsilon<1$ is the efficiency factor and $\Delta t$ is the sample period. Note that negative $T_{sta}$ corresponds to torque absorption and results in $\sigma$ increasing; positive $T_{sta}$ corresponds to torque generation and results in $\sigma$ decreasing.

The fundamental relation that must be satisfied during the engine operation is the torque balance:

$$T_e + T_{sta} = T_d \quad (2)$$

That is, the choice of variables that control engine operation and the choice of variables that control STA operation must conform to this equation.

Consider now the situation when the engine 10 is running in the stratified lean or the homogeneous lean mode. The ECU initiates the algorithm 46 and the algorithm software flag requesting the switch to the LNT purge mode is turned on 48. If the state of charge is not less than the upper limit of the state of charge 50 and the purge mode is on, it is necessary to decrease the air-to-fuel ratio to below the stoichiometry 52. However, if the charge is less than the upper limit of the state of charge 54, in addition to reducing the A/F ratio, several controls are initiated to accomplish the basic ideas of:

1. keeping the throttle open while almost instantaneously decreasing the air-to-fuel ratio by increasing the fueling rate;

2. switching the injection timing (from stratified to homogeneous); and 3. engaging the STA so that the increase in the engine torque is absorbed by the STA and the extra enery is stored in the energy storage or battery.

There are several advantages to this new strategy and use of an STA 34 as compared to the standard strategy that is used for an engine without the STA, the prior art. In the prior art, the standard strategy for an engine without an STA first adjusts the throttle and increases fueling rate to compensate for torque drop (in a manner that keeps equation (2) satisfied. Then, once the airflow drops sufficiently, the switch to the purge mode is initiated by almost instantaneously increasing the fueling rate and retarding spark to ensure that equation (2) holds.

The advantages to the new strategy, as defined herein, are as follows. First, the STA 34 is a faster actuator than the electronic throttle, it has the direct influence on the engine torque and it is more suitable for torque disturbance mitigation. Second, in terms of brake specific fuel consumption, engine operation at higher loads is more efficient at least for the homogeneous operation during the purge mode. The efficiency is also gained due to reduced pumping losses when the throttle is open. Third, the extra energy generated by the engine during the purge mode is stored for the future use during the lean mode, e.g., to shift the engine operation away from less efficient or emission-troublesome operating regimes. Fourth, the use of an STA for torque management frees up spark timing for use for emission control (e.g., for exhaust temperature management). The separate phases of transition between the purge mode and the lean mode are hereinafter described.

Let $T'_e$ be the predicted engine torque after the switch to the purge mode. Since engine operation during the switch to the purge mode and the purge mode is normally accomplished with the EGR valve 56 closed, F1 is set to zero in calculating $T'_e$, and spark timing is set to a value obtained from the purge calibration. If $T'_e - T_d < T^{max}_{sta}$, the switch to the purge mode can be initiated by almost instantaneously decreasing the air-to-fuel ratio by increasing the fueling rate, switching the injection timing (from stratified to homogeneous) and engaging the STA 34 so that the increase in the engine torque is absorbed by the STA and the extra energy is stored in the energy storage or battery 38.

If the condition $T'_e - T_d < T^{max}_{sta}$ is violated, then some preparations before the switching are necessary. Specifically, the electronic throttle is adjusted to reduce engine airflow and simultaneously the fueling rate is increased to compensate for possible torque drop so that equation (2) holds. This has an effect of decreasing engine intake airflow and, hence, a smaller fueling rate increase at the switch time is required to decrease the air-to-fuel ratio to the desired purge value. Once the condition $T'_e - T_d < T^{max}_{sta}$ holds, the switch to the purge mode can proceed as described above, i.e., by almost instantaneously increasing the fueling rate, switching the injection timing (from stratified to homogeneous), and engaging the STA so that the increase in the engine torque is absorbed by the STA and the extra energy is stored in the energy storage 38.

In abnormal cases when, for example, the energy storage is full 52, the STA cannot be used during the switch. Then, the switch to the purge mode has to be done using the standard strategy described above. First closing the electronic throttle, increasing fueling rate to prevent torque variations, retarding the spark timing and increasing fueling rate simultaneously at the time instant of the switch in a manner that keeps equation (2) satisfied.

Typically, in the purge mode, the engine supplies the torque $T'_e$, while any variations in the torque demand are handled by the STA: $T_{sta} = T'_e - T_d$. If the condition $T'_e - T_d < T^{max}_{sta}$ becomes violated (for example, due to (approaching an upper limit), we use the STA to absorb maximum possible torque, $T_{sta} = T^{max}_{sta}$, and use the electronic throttle, spark and fueling rate inputs to accomplish the following objectives: (i) keep the air-to-fuel ratio at the prescribed purge value $\phi_{purge}$; and (ii) ensure that equation (2) holds. The first objective is achieved by using the estimate of the airflow to the engine ($W_a$) to set the fueling rate $W_f = (W_a)/\phi_{purge}$. The second objective is achieved by adjusting the electronic throttle so that $$\Phi(N_e, W_a) = T_e(N_e, W_a/\phi_{purge}, \theta_{pc}, W_a, 0, hom') = T_d - T^{max}_{sta}. \quad (3)$$

Here, $\theta_{pc}$ is the value of the spark corresponding to the optimized engine purge calibration.

Standard control design methods can be employed to ensure that equation (3) holds. One approach is briefly summarized below. First, note that the time rate of change of the intake manifold pressure p satisfies:

$$dP/dt = k(f(s)g(p) - W_a), W_a = K(N_c)p, \quad (4)$$

where (s) is the throttle position; the term $f(s)g(p)$ is the standard orifice equation representation for the throttle flow; k is a constant that depends on the intake manifold volume and intake manifold temperature; and K is the engine pumping function stored in the ECU as a look-up table or as a regression. The function K depends at least on the engine speed. By differentiating the equality (3) and expressing $dW_a/dt$ from (4), the required throttle position can be expressed as a function of $N_c$, $dN_c/dt$ p, $dT_d/dt$ and $dT^{max}_{sta}/dt$:

$$s = \Psi(N_c, dN_c/dt \, p, dT_d/dt, dT^{max}_{sta}/dt) \quad (5)$$

A regression equation for this function can be stored in the ECU while the required time-derivatives can be estimated numerically using standard algorithms. Alternatively, spark control can be also employed in combination with the electronic throttle for torque control during purge. The use of spark control may be, actually, required if the throttle actuator is too slow.

Once the purge is completed 58, the switch back to the lean operating mode can be accomplished provided that the speed-load conditions are adequate for running the engine lean, possibly with the assistance from the STA. Prior to the switching to the lean mode, if the engine is operating in a throttled condition 60, the throttle is opened while the fueling rate is simultaneously decreased to compensate for possible torque surge. At the moment of the switch almost instantaneously the fueling rate is decreased and $T_{sta}$ is set to zero (or a value necessary to meet the torque demand for higher loads).

During the lean operation 62, when the state of charge is greater than the minimum level of charge, the STA can apply some of the energy stored during the purge to help the engine meet higher levels of torque demand and to shift engine operation to fuel economy and emission-favorable regions. For example, in a stand-alone configuration 64, where the state of charge is less than the lower limit, the engine can only be run in the homogeneous mode to meet some of the higher loads. Yet, with the STA and with the state of charge greater than the minimum limit, the engine may be run in the hybrid mode 66 or in the stratified mode or a leaner homogeneous mode because the extra torque can be supplemented by the STA. In this situation, the engine not only uses less fuel but also the temperature conditions for LNT operation may be cooler and, therefore, more favorable to maintain high levels of LNT trapping efficiency. A relation of the form, $$T_{sta} = k(N_c, T_d, \omega) T^{max}_{sta}$$

can be used to determine the torque supplemented by the STA for each engine operating condition, where k is stored in the ECU as a look-up table.

There has thus been shown and described a method and apparatus for torque control for direct injected or lean burn engines having a lean NOx trap in the exhaust system and a supplemental torque apparatus operatively connected to the engine.

The method comprises the steps of identifying the time 46 for purging the LNT by means of a flag in an algorithm in the electronic control unit. Next the state of charge 50 of the vehicle battery is determined. The algorithm then operates to change the operational mode 52, 54 of the engine from lean to a rich air/fuel ratio, wherein such change results in an increased engine torque.

The LNT is purged 58 of NOx by the increased fueling rate of the rich air/fuel ratio while maintaining the desired torque output of the engine during the purging. A supplemental torque apparatus operates to convert the increased engine torque into electrical energy, some of which is stored in the vehicle battery in the case of CAS or in some other form such as kinetic energy in the case of a flywheel. The algorithm operates to change the operational mode of the engine from the rich air/fuel ratio back to the lean air fuel ratio wherein the supplemental torque apparatus controls the release of the stored electrical energy.

We claim:

1. A method for torque control for a drive unit, wherein the drive unit includes a fuel-injected engine having an exhaust system including a lean NOx trap and operable in a plurality of modes including lean modes characterized by combustion of lean air-fuel mixtures and rich modes characterized by combustion of rich air-fuel mixtures, and a supplemental torque apparatus operatively connected to the engine for storing and releasing energy, the method comprising:

identifying a time for purging the lean NOx trap;

determining a state of energy storage in the supplemental torque apparatus;

changing the operational mode of the engine from a first lean mode to a first rich mode, wherein such change results in an increased engine torque and a purging of the lean NOx trap;

maintaining the desired torque output of the drive unit during the first rich mode by converting the increased engine torque into energy and storing the energy in the supplemental torque apparatus;

changing the operational mode of the engine from the first rich mode to a second lean mode; and then controlling the release of the stored energy.

2. The method of torque control according to claim 1 wherein storing the energy includes charging a battery.

3. The method of torque control according to claim 1 wherein the supplemental torque apparatus includes an alternator-starter operatively connected to the engine, and wherein converting the increased engine torque includes controlling the output of the alternator-starter.

4. The method of torque control according to claim 2 wherein determining the state of energy storage is determining the state of the charge of the battery.

5. A system for torque control for a lean-burn engine, wherein the lean-burn engine includes a fuel-injected, spark-ignition engine having an output shaft, an air intake system mounted having a throttle body for admitting air to the engine, an electronic control unit for controlling the engine including fuel injection and ignition timing, an exhaust manifold system having a catalyst in line with a lean NOx trap apparatus, and sensors operatively connected to the exhaust manifold system for sensing the state of the exhaust gas therein and operatively connected to the electronic control unit, and wherein the engine is operable in a plurality of modes including lean modes characterized by combustion of lean air-fuel mixtures and rich modes characterized by combustion of rich air-fuel mixtures, the system comprising:

torque control algorithm means located in the electronic control unit for controlling a mode transition of the engine from a first lean mode to a first rich mode and from the first rich mode to a second lean mode, whereby the mode transition is characterized by a purging of the lean NOx trap apparatus;

a supplemental torque apparatus coupled to the output shaft of the engine, said supplemental torque apparatus including an energy storage device and being operable in response to said torque control algorithm means to drive said output shaft with energy stored in said energy storage device when said lean NOx trap apparatus is not being purged and to charge said energy storage device during the purging of said lean NOx trap apparatus.

6. A system for torque control for a lean-burn engine according to claim 5 wherein said energy storage device is a battery.

7. A system for torque control for a lean-burn engine according to claim 5 wherein said supplemental torque apparatus is an electric alternator-starter device operatively connected to the output shaft of the engine and to a battery.

8. A system for torque control for a lean-burn engine according to claim 5 wherein said engine is a direct-injected spark-ignited engine.

9. A system for torque control for a lean-burn engine according to claim 5 wherein said electronic control unit comprises an algorithm, said algorithm operating to maintain the throttle position during the mode transition from the first lean mode to the first rich mode;

said algorithm operating to increase the width of a fuel injection signal to increase the amount of fuel delivered to the engine; and said algorithm operating to decrease the width of the fuel injection signal during the mode transition from the first rich mode to the second lean mode.

10. A system for torque control for a lean-burn engine according to claim 5 wherein said engine is a hybrid engine and said supplemental torque control apparatus operates to apply regenerative braking and to provide supplemental engine torque for said hybrid engine.

11. A system for torque control for a lean-burn engine according to claim 5 wherein said engine is a stratified-charge engine.

12. A method for torque control for a drive unit, wherein the drive unit includes a fuel-injected, spark-ignited engine having an intake manifold supplying air to at least one cylinder and an exhaust system including a lean NOx trap, and a supplemental torque apparatus operatively connected to the engine, the method including:

measuring the airflow into the engine;

controlling the amount of exhaust gases recirculated from the exhaust system to the intake manifold of the engine;

controlling the spark timing and the fuel charge mixture in the at least one cylinder of the engine;

determining the output torque of the engine, the load torque being supplied by the engine and the torque being supplied by the supplemental torque apparatus; and then controlling the charging and absorption of the supplemental torque apparatus to maintain the total torque demand in the system according to the relationship $T_e + T_{sta} = T_d$ wherein $T_e$ equals engine torque, $T_{sta}$ equals the torque generated or absorbed by the supplemental torque apparatus and $T_d$ equals total torque demand of the engine system.

* * * * *